(12) United States Patent
Lallemand et al.

(10) Patent No.: US 12,476,833 B2
(45) Date of Patent: Nov. 18, 2025

(54) MANAGEMENT OF ELECTRICAL POWER SUPPLY VIA ETHERNET CABLE

(71) Applicant: ECOGREEN SOFT SPRL, Namur (BE)

(72) Inventors: Xavier Lallemand, Bois de Villers (BE); Olivier Hemerijck, Courriére (BE)

(73) Assignee: ECOGREEN SOFT SPRL, Namur (BE)

( * ) Notice: Subject to any disclaimer, the term of this patent is extended or adjusted under 35 U.S.C. 154(b) by 0 days.

(21) Appl. No.: 17/922,534

(22) PCT Filed: May 6, 2021

(86) PCT No.: PCT/EP2021/061952
§ 371 (c)(1),
(2) Date: Oct. 31, 2022

(87) PCT Pub. No.: WO2021/224371
PCT Pub. Date: Nov. 11, 2021

(65) Prior Publication Data
US 2023/0269106 A1   Aug. 24, 2023

(30) Foreign Application Priority Data

May 7, 2020   (BE) .................................. 2020/5306

(51) Int. Cl.
*G06F 1/26* (2006.01)
*H04L 12/10* (2006.01)
(Continued)

(52) U.S. Cl.
CPC ................ *H04L 12/10* (2013.01); *G06F 1/26* (2013.01); *H04L 12/12* (2013.01); *H04L 12/2807* (2013.01)

(58) Field of Classification Search
None
See application file for complete search history.

(56) References Cited

U.S. PATENT DOCUMENTS 10,489,055 B2 * 11/2019 Jayaram .................. H04W 4/50
2006/0109728 A1   5/2006 Dwelley et al.
(Continued)

FOREIGN PATENT DOCUMENTS

CN   103404165 A   11/2013
CN   103843287 A   6/2014
(Continued)

OTHER PUBLICATIONS

International Search Report with English Translation and Written Opinion for PCT Application No. PCT/EP2021/061952, dated Jul. 1, 2021, pp. 1-13.

*Primary Examiner* — Danny Chan
(74) *Attorney, Agent, or Firm* — DICKINSON WRIGHT PLLC

(57) ABSTRACT

The present disclosure relates to a method for managing the supply of electrical power to Ethernet devices. The Ethernet devices are connected to a management system via an Ethernet cable supplying them with current. When input information is received by the management system, the management system determines, on the basis of a first list of the Ethernet devices, whether it has to interrupt the supply of power to one or more of the Ethernet devices or, conversely, to re-establish the supply of power thereto.

13 Claims, 2 Drawing Sheets

1000: method
100: determining
105: first list
110: receiving
115: input information
125: identifier
120: determining
135: ethernet device
130: interrupting the electrical current
140: re-establishing the electrical current

(51) Int. Cl.
*H04L 12/12* (2006.01)
*H04L 12/28* (2006.01)

(56) References Cited

U.S. PATENT DOCUMENTS

| | | | | |
|---|---|---|---|---|
| 2007/0038866 | A1* | 2/2007 | Bardsley | H04L 63/0272 |
| | | | | 713/182 |
| 2009/0112373 | A1* | 4/2009 | Feldman | G06F 1/3209 |
| | | | | 700/297 |
| 2010/0217965 | A1 | 8/2010 | Wolff | |
| 2011/0185055 | A1* | 7/2011 | Nappier | H04L 63/08 |
| | | | | 709/224 |
| 2012/0065802 | A1* | 3/2012 | Seeber | H02J 13/00004 |
| | | | | 700/295 |
| 2015/0046458 | A1* | 2/2015 | Hu | G06Q 50/01 |
| | | | | 707/738 |
| 2016/0246341 | A1* | 8/2016 | Burrell | G06F 1/3231 |
| 2018/0278488 | A1* | 9/2018 | Kutty | H04L 12/10 |

FOREIGN PATENT DOCUMENTS

| | | |
|---|---|---|
| JP | 2004215086 A | 7/2004 |
| JP | 2007281628 A | 10/2007 |
| JP | 2009260407 A | 11/2009 |
| KR | 102074190 B1 | 2/2020 |
| RU | 2606876 C2 | 1/2017 |
| WO | 2006055163 A1 | 5/2006 |
| WO | 2013107015 A1 | 7/2013 |
| WO | 2016029421 A1 | 3/2016 |

* cited by examiner

| 305 | 21 | 31 |
|---|---|---|
| | 22 | 32a 32b |
| | 23 | 33 |
| | . | . |
| | . | . |
| | . | . |

| 405 | 21 | 41 |
|---|---|---|
| | 22 | 42 |
| | 23 | 43 |
| | . | . |
| | . | . |
| | . | . |

305: third list
405: user list
21, 22, 23: identifiers
31, 32a: user devices
32b, 33: electronic calendars
41, 42, 43: users 1000: method
100: determining
105: first list
110: receiving
115: input information
125: identifier
120: determining
135: ethernet device
130: interrupting the electrical current
140: re-establishing the electrical current 105: first list
61, 62, 63a, 63b: ethernet devices
71a, 71b, 72, 73: identifiers

| 105 | 61 | 71a 71b |
|---|---|---|
| | 62 | 72 |
| | 63a 63b | 73 |
| | . | . |
| | . | . |
| | . | . |

MANAGEMENT OF ELECTRICAL POWER SUPPLY VIA ETHERNET CABLE

CROSS-REFERENCE TO RELATED APPLICATION(S)

This present application is a national stage application of International Patent Application No. PCT/EP2021/061952, filed May 6, 2021, which claims priority to Belgium Patent Application No. 2020/5306, filed May 7, 2020, the disclosures of which are hereby incorporated by reference in their entireties.

TECHNICAL FIELD

The present invention relates to the management of the supply of electrical power via Ethernet cable of Ethernet devices, referred to as Power by Ethernet or PoE.

BACKGROUND

The supply of electrical power by Ethernet cable allows only one Ethernet cable to be used to supply electrical power and exchange data with an Ethernet device.

The document WO2016/029421 A1 describes a system in a power supply sourcing equipment power-supplies a device power-supplied by an Ethernet cable. The power supply sourcing equipment controls the power on/off of the power-supplied device.

The document US2010/0217965 A1 describes a cascaded network, with different types of terminals connected via Ethernet but of such a nature that some need to be permanently power-supplied (Emergency) and others not.

The document WO2013/107015 A1 describes a PoE system comprising a power-supplied device, a power supply sourcing equipment, and a power supply management module. The management module of the power supply is connected to an Ethernet physical layer and a power supply sourcing module within the power supply sourcing equipment.

SUMMARY OF THE INVENTION

An object of the present invention is to reduce the energy consumption.

The invention proposes a method for managing the supply of electrical power to Ethernet devices, each Ethernet device being electrically power-supplied by an Ethernet cable, the method comprising the following steps:
  determining a first list of Ethernet devices and identifiers, the first list mapping the Ethernet devices to the identifiers,
  receiving an input information allowing to determine one of the identifiers,
  determining, on the basis of the first list, the Ethernet device corresponding to the determined identifier, and
  interrupting the electrical current or re-establishing the electrical current to the Ethernet cable supplying power to the determined Ethernet device.

The invention particularly proposes a method for managing the supply of electrical power to Ethernet devices, each Ethernet device being electrically power-supplied by an Ethernet cable connected to a management system comprising a memory storing a first list of Ethernet devices and identifiers, the first list mapping the Ethernet devices to the identifiers; the method comprising the following steps:
  the management system receives an input information allowing to determine one of the identifiers,
  the management system determines, on the basis of the first list, the Ethernet device corresponding to the determined identifier, and
  the management system interrupts the electrical current or re-establish the electrical current to the Ethernet cable supplying power to the determined Ethernet device;
  characterised in that the reception of the input information allowing for determining said at least one of the identifiers is triggered by an operation using an input system, distinct from the Ethernet devices and the management system, and comprising a user device and/or an electronic calendar corresponding to one of the identifiers; the input information indicating the user device or the electronic calendar used in the operation.

Since, following the interruption of the current to the Ethernet cable of the determined Ethernet device, no current reaches the determined Ethernet device, the method according to the invention allows to completely cut off the power supply to the determined Ethernet device when it is not needed. The determined Ethernet device is therefore not put in standby mode but completely powered off as it does not receive any electrical power. The input information thus results in a total interruption of the energy consumption of the determined Ethernet device.

The first list allows the link, in an automatic way, between the input information received by the management system and the Ethernet device to be cut. In other words, each identifier in the first list identifies at least one of the Ethernet devices connected to the management system. Thus, the input information allows to determine one of the identifiers in the first list and thus, via the first list, which Ethernet device is to be switched off or on.

Preferably, the input information contains the identifier of the user device or electronic calendar used in the operation, which corresponds to one of the Ethernet device identifiers.

In the method according to the invention, an operation using a user device and/or an electronic calendar corresponding to one of the identifiers triggers a sending of the input information, for example by the input system. This input information indicates the user device or the electronic calendar used in the operation. Thus, when the management system receives this information, it can map the user device and/or electronic calendar to one of the Ethernet devices, and interrupt the current or re-establish the current to the cable connecting that determined Ethernet device.

In the method according to the invention, the operation using the input system may be automatic or may be carried out by a user. Sending and receiving the input information, determining the Ethernet device based on the input information and the first list, and interrupting or re-establishing the current to the corresponding Ethernet cable are preferably automatic.

Once an Ethernet device is cut off, the method can be used to turn it back on automatically based on basis of the input information.

It is also possible, in the context of the invention, for all Ethernet devices to be initially cut off (e.g. because they are all cut off automatically in the evening when the alarm system of the building activates), and to be switched back on as input information is received (e.g. in the morning when the employees arrive in the building).

The invention allows to reduce the electric consumption and thus the carbon footprint. In addition, by completely cutting off the supply of electrical power to Ethernet devices such as WIFI antennas, it allows to reduce the emission of electromagnetic waves.

As used in the present document, an "Ethernet device" is an electrical device that is connectable to an Ethernet cable such that the supply of electrical power to the device is, at least partly and preferably entirely, ensured by the Ethernet cable. The Ethernet cable also preferably allows the Ethernet device to send and/or receive data.

The Ethernet cables are connected to the Ethernet devices on the one hand and to a management system on the other. The input system is separate from the management system: the Ethernet cables that power-supply the Ethernet devices are not physically connected to the management system. The input system is separate from the Ethernet devices: its power supply cannot be cut off or re-established by the method according to the invention.

In one embodiment, the operation is carried out by a user using the user device.

In one embodiment, the first list is determined by scanning Ethernet cables connected to the management system, so as to determine the Ethernet devices connected to the management system. The scan preferably uses the Session Initiation Protocol (SIP). It can be carried out several times a day.

In one embodiment, the Ethernet cables are connected on the one hand to the Ethernet devices and on the other hand to ports of a management system, for example to ports of a network switch of the management system, the interruption of the electrical current being carried out by closing the port connected to the Ethernet cable supplying power to the determined Ethernet device, and the re-establishment of the electrical current being carried out by opening the port connected to the Ethernet cable supplying power to the determined Ethernet device.

In one embodiment, the method comprises a determination of the first list. The first list is preferably determined by receiving a list of users, each user corresponding to one of the identifiers. Thus, the management system can be provided with a list of users (which allows to provide the identifiers in the first list) with their landline telephone reference (which allows to provide the Ethernet devices in the first list).

There are many ways to determine the first list, for example based on the input of information into the management system and/or operations carried out by the management system, such as the scan mentioned above.

In one embodiment, the input information allows to determine whether to trigger an interruption of the electrical current or a re-establishment of the electrical current to the Ethernet cable.

In an embodiment, the operation with said user device is a reading by a user device reader.

In one embodiment, the user device comprises a clocking device, and the operation triggering the reception is a clocking in, which triggers a re-establishment of the electrical current to the Ethernet cable, or a clocking out, which triggers an interruption of the electrical current to the Ethernet cable. Thus, when an employee leaves its work by clocking out, the power supply to its Ethernet device is cut off, and it is re-established when they arrive at work by clocking in.

In one embodiment, the user device comprises a geolocation device, and the operation triggering the reception of the input information is a geolocation within a predetermined area. Thus, when an employee leaves work by exiting a space that defines a predetermined area or by passing through a gate that defines a predetermined area, the power supply to its Ethernet device is cut off. The power supply is re-established when he arrives at work by entering said space or by passing through said gate. The geolocation device can be, for example, an RFID chip or a GPS.

In an embodiment where at least one of the identifiers corresponds to the electronic calendar, the input information comes from a data resulting from said electronic calendar.

In one embodiment, the first list maps to at least one of the identifiers to a plurality of Ethernet devices, and the reception of an input information allowing to determine the at least one of the identifiers triggers an interruption of the electrical current or a re-establishment of the electrical current to the Ethernet cables supplying power to all Ethernet devices corresponding to the determined identifier.

In one embodiment, the first list maps a plurality of identifiers to at least one of the Ethernet devices. For example, an Ethernet printer can correspond to several identifiers.

In an embodiment, the input information also allows to determine whether the determined identifier is in a first state or in a second state, wherein the re-establishment of the electrical current to the Ethernet cable supplying power to the determined Ethernet device being triggered if at least one of the identifiers is in the first state, and the interruption of the electrical current to the Ethernet cable supplying power to the determined Ethernet device being triggered if all the identifiers are in the second state.

In one embodiment, at least one of the Ethernet devices is: a telephone, e.g. a landline telephone, an automated banking machine, e.g. Bancontact type, an antenna, e.g. a WIFI antenna, an interactive terminal, a screen, a printer, a camera, or a docking station.

The invention further proposes an Ethernet device management system configured to implement a method according to any of the embodiments of the invention.

The invention further proposes a computer program comprising instructions that lead to a management system to execute the steps of a method according to any one embodiment of the invention. The program can for example run on a server and/or on a network switch of the management system.

The invention further proposes a computer-readable medium on which said computer program is recorded.

BRIEF DESCRIPTION OF THE FIGURES

Further characteristics and advantages of the invention will become apparent from the following detailed description, for the understanding of which reference is made to the appended figures, among which.

EMBODIMENTS OF THE INVENTION

The present invention is described with particular embodiments and references to figures but the invention is not limited thereby. The drawings or figures described are only schematic and are not limiting.

In the context of this document, the terms "first" and "second" are used only to differentiate the various elements and do not imply an order between these elements.

In the figures, the identical or similar elements may have the same references.

Figure 1:
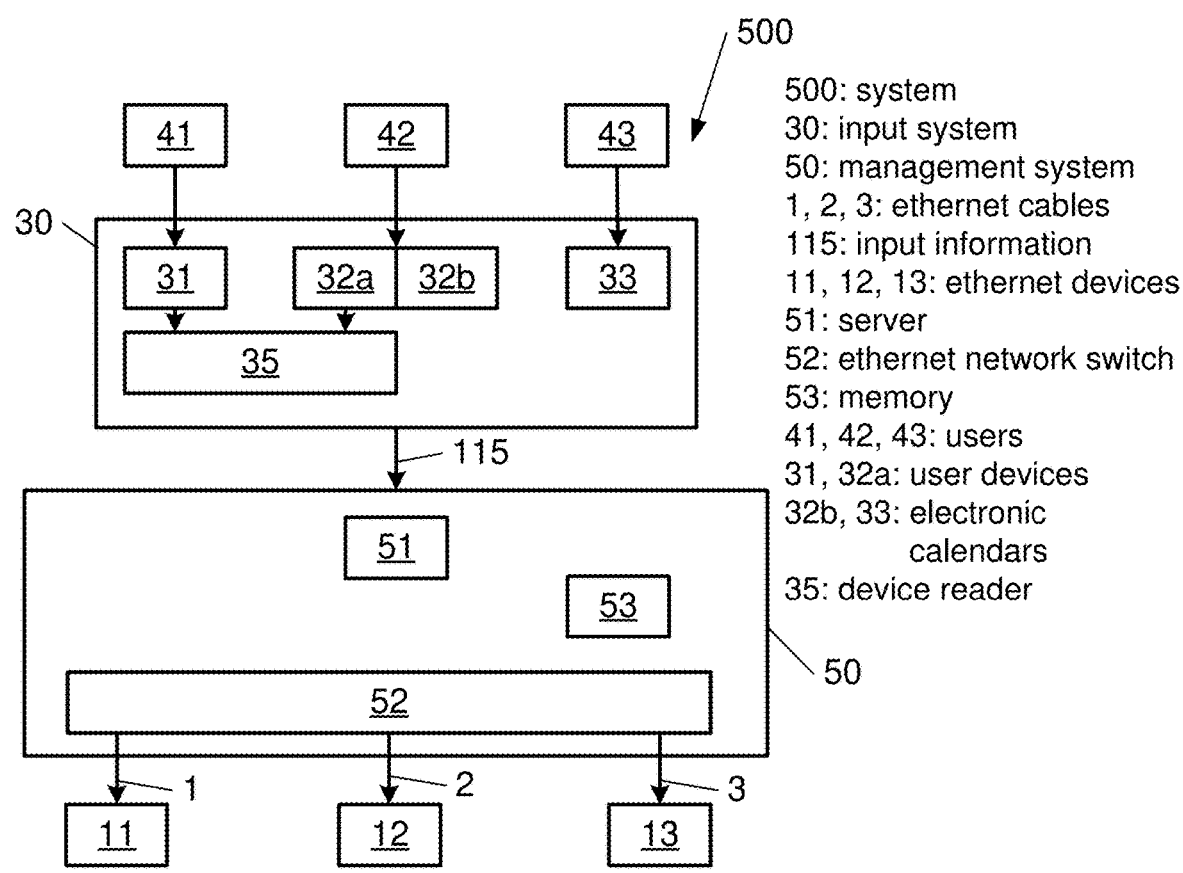
FIG. 1 shows an example of a system for implementing the invention.

FIG. 1 shows an example of a system 500 according to the invention. The system 500 comprises an input system 30 and a management system 50 to which Ethernet cables 1, 2, 3 are mechanically and electrically connected. The management system 50 receives information, for example an input information 115 emitted from the input system 30. It sends information to Ethernet devices 11, 12, 13 via Ethernet cables 1, 2, 3, and supplies power to the Ethernet devices 11, 12, 13 via their Ethernet cables 1, 2, 3.

The management system 50 preferably comprises a server 51, an Ethernet network switch 52, and a memory 53 (which may be comprised in the server 51 and/or in the network switch 52). The network switch 52 comprises a series of ports allowing for plugging the Ethernet cables 1, 2, 3 in.

The management system 50, the server 51 and the network switch 52 may for example comprise an arithmetic and logic unit, selected from: a central processing unit (CPU), a digital signal processor (DSP), an application specific integrated circuit (ASIC), a field programmable gate array (FPGA) or a combination thereof and may also include digital or analogue electronic elements or a combination thereof.

The input system 30 may be operated, directly or indirectly, by users 41, 42, 43. It may comprise in particular user devices 31, 32a, electronic calendars 32b, 33 or other electronic devices and/or computer programs. It may also comprise one or more user device readers 35 capable of reading the user devices 31, 32a by detecting an identifier linked to the user device 31, 32a being read.

The memory 53 comprises a first list 105 (FIG. 2) which maps the Ethernet devices 11, 12, 13 to identifiers 21, 22, 23, which are the identifiers of the Ethernet devices 11, 12, 13. It may also comprise a second list 205 (FIG. 3) that maps the Ethernet devices 11, 12, 13 and the Ethernet cables 1, 2, 3 connected to them. It may also comprise a third list 305 (FIG. 4) that maps the identifiers 21, 22, 23 of the Ethernet devices 11, 12, 13 to the user devices 31, 32a, and/or the electronic calendars 32b, 33 that have been assigned to the Ethernet devices 11, 12, 13 identified by those identifiers 21, 22, 23. It may also comprise a user list 405 (FIG. 5) that maps the users 41, 42, 43 to identifiers 21, 22, 23 of the Ethernet devices 11, 12, 13. Preferably, there is only one identifier per user. A database located in the memory 53 may comprise the first list 105, and possibly one or more of the other lists. The different lists 105, 205, 305, 405 are preferably combined in the form of the database.

Figures 4, 5, 6, 7:
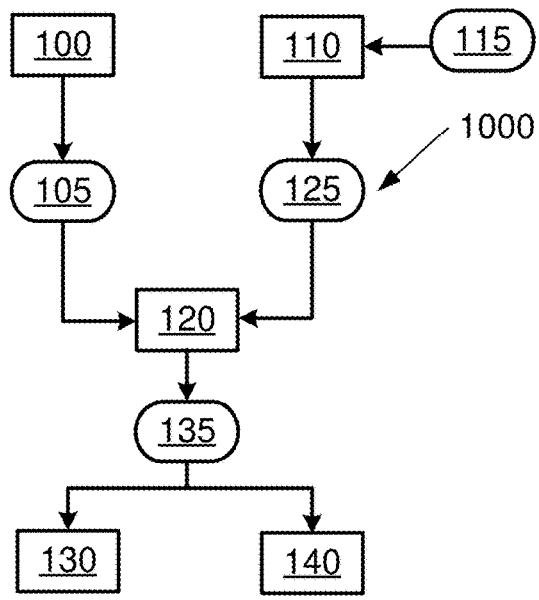
FIG. 4 is a very schematic example of a third list that maps identifiers to user devices.
FIG. 5 is a very schematic example of a user list that maps identifiers to users.
FIG. 6 illustrates a method according to one embodiment of the invention.
FIG. 7 is a second very schematic example of a first list that maps Ethernet devices to identifiers.

FIG. 6 illustrates a method 1000 for managing the supply of electrical power to Ethernet devices 1, 12, 13 according to one embodiment of the invention.

Figure 2:
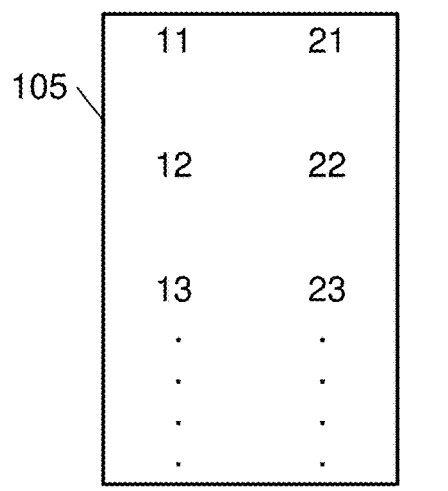
FIG. 2 is a first very schematic example of a first list that maps Ethernet devices to identifiers.
Figure 3:
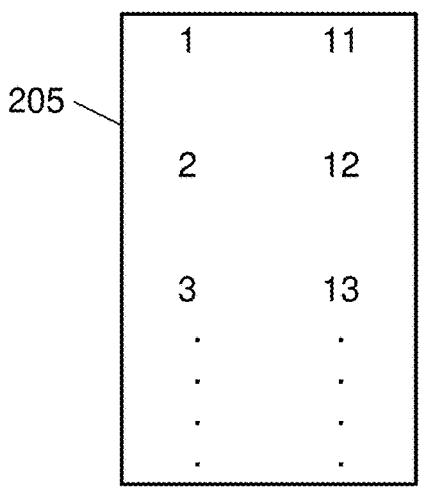
FIG. 3 is a very schematic example of a second list that maps Ethernet devices to Ethernet cables.

The method 1000 comprises a step of determining 100 a first list 105 of Ethernet devices 11, 12, 13 and identifiers 21, 22, 23. A very schematic example of the first list 105 is shown in FIG. 2. The determination 100 of the first list 105 is preferably carried out by the management system 50, but may be carried out elsewhere and then provided to the management system 50 while remaining within the scope of the invention. It may comprise a scan of the Ethernet cables 1, 2, 3 connected to the management system 50, so as to determine the Ethernet devices 11, 12, 13 connected to the management system 50. It may in particular comprise the reception of a list 405 (as shown in FIG. 5) of users 41, 42, 43, each user corresponding to one of the identifiers 21, 22, 23. For example, a file containing the list 405 of users can be loaded onto the management system 50.

The determination 100 of the first list 105 may comprise a validation of a pre-project of first list provided to the management system 50 or established by the management system 50. The determination 100 of the first list 105 may consist of a validation of a pre-project of first list provided to the management system 50.

The method 1000 comprises a step of receiving 110 an input information 115 allowing for determining one 125 of the identifiers 21, 22, 23 of the first list 105.

In an embodiment of the invention, the input system 30, on the basis of an operation carried out, directly or indirectly, by a determined user, sends to the management system 50 an input information 115 allowing to determine the identifier 125 corresponding to the determined user. For example, the input information 115 indicates the user device 31, 32a or the electronic calendar 32b, 33 used in the operation, which allows the management system 50 to link to a determined identifier 125 based on the third list 305. The link between the input information and the identifier can be made in any way.

The method 1000 comprises a step of determining 120 the identifier 125 contained in the input information 115, and based on the first list 105, the Ethernet device 135 corresponding to the determined identifier 125. The management system 50 is now aware of the determined Ethernet device 135 for which it is to turn on or off the supply of electrical power.

The method 1000 comprises a step of interrupting the electrical current 130 or re-establishing the electrical current 140 to the Ethernet cable supplying power to the determined Ethernet device 135. The cut 130 or the re-establishment 140 of the electrical current occurs at the level of the management system 50, preferably at the level of the network switch 52.

In an embodiment of the invention, the input information 115 allows to determine whether to trigger an interruption of the electrical current 130 or a re-establishment of the electrical current 140 to the Ethernet cable. For example, the user device 31 may be a badge for opening a door and the user device reader 35 comprises a first portion on a first (preferably outer) side of the door, and a second portion on a second (preferably inner) side of the door. When the user device 31 is read by the first portion of the reader 35, it indicates that the user 41 is entering. The input information 115 allows to determine the use of the user device 31 and indicates that the current should be re-established. When the user device 31 is read by the second portion of the reader 35, it indicates that the user 41 is exiting. The input information 115 allows to determine the use of the user device 31 and indicates that the current should be interrupted.

In an embodiment of the invention, where at least one of the identifiers 21, 22 corresponds to a user device 31, 32a, the reception 110 of the input information 115 is triggered by an operation using the user device 31, 32a, for example a reading by a user device reader 35.

For example, the user device 31 may comprise an RFID chip, and the operation may be a reading of the RFID chip by an RFID sensor that is comprised in a user device reader 35. The reading may be consciously triggered by the user 41 or may occur automatically as the user passes in the vicinity of the reader 35, thereby allowing to geolocate the user device 31.

In an embodiment of the invention, at least one of the identifiers 22, 23 corresponds to an electronic calendar 32b, 33, and the input information 115 comes from a data resulting from said electronic calendar 32b, 33. For example, the electronic calendar 33 may be the booking calendar of a meeting room (which is then considered as the "user 43"), an input information 115 indicating to re-establish the current is sent at the beginning of each meeting indicated in the electronic calendar 33, and an input information 115 indicating to interrupt the current is sent at the end of each meeting indicated in the electronic calendar 33. This allows the Ethernet devices in this room 43 to be power-supplied only when the calendar 33 has registered a booking for this room 43.

In an embodiment of the invention, the input information 115 also indicates whether the determined identifier 125 is in a first state, e.g. a present state for the user corresponding to the determined identifier 125, or in a second state, e.g. an absent state for the user corresponding to the determined identifier 125. The states of the identifiers 21, 22, 23 can be stored in the memory 53.

The user device reader 35 may, for example, be stationary, preferably attached to a wall. It is also possible, while remaining within the scope of the invention, that a specific user device reader 35 is mechanically attached to a specific Ethernet device. This allows to interrupt the current or to re-establish the current in that specific Ethernet device, based on an input information 115 sent by the specific user device reader 35. The specific user device reader 35 either does not require an external supply of electrical power (because it comprises a battery, a cell or because its technology does not require a supply of electrical power) or is power-supplied by some means other than the Ethernet cable of the specific Ethernet device.

FIG. 7 is a highly schematic example of a first list 105 that maps Ethernet devices 61, 62, 63a, 63b to identifiers 71a, 71b, 72, 73. The Ethernet device 61 corresponds to two identifiers 71a, 71b. The Ethernet device 62 corresponds to an identifier 72. The Ethernet devices 63a, 63b correspond to an identifier 73.

Preferably, when an Ethernet device 61 corresponds to more than one identifier 71a, 71b, the input information 115 also allows to determine whether the determined identifier 125 is in a first state or in a second state: the re-establishment of the electrical current 140 to the Ethernet cable supplying power to the determined Ethernet device 73 is triggered if at least one of the identifiers 71a, 71b is in the first state, and the interruption of the electrical current 130 to the Ethernet cable supplying power to the determined Ethernet device 61 is triggered if all the identifiers 71a, 71b corresponding to the determined Ethernet device 61 are in the second state. For example, if the first state indicates that the user corresponding to the identifier is present, and the second state indicates that it is absent, this allows the Ethernet device 61 common to multiple users 71a, 71b to be power-supplied if at least one of its users 71a, 71b is present, and to be cut off if all its users 71a, 71b are absent.

Preferably, when one of the identifiers 73 corresponds to a plurality of Ethernet device 63a, 63b, the reception 110 of the input information 115 results in an interruption of electrical current 130 or a re-establishment of the electrical current 140 to the Ethernet cables supplying power to all Ethernet devices 63a, 63 corresponding to the determined identifier 73. For example, an identifier may correspond to an Ethernet telephone, an Ethernet docking station, and an Ethernet screen, all of which are powered on (respectively off) when the user corresponding to the identifier enters (respectively exits) the building.

In other words, the invention relates to a method for managing the supply of electrical power to Ethernet devices 11, 12, 13. The Ethernet devices 11, 12, 13 are connected to a management system 50 via an Ethernet cable 1, 2, 3 ensuring their power supply in current. When an input information 115 is received by the management system 50, it determines, based on a first list 105 of the Ethernet devices 11, 12, 13, whether to cut off the power supply to one or more of the Ethernet devices 11, 12, 13, or, alternatively, to re-establish their power supply.

The present invention has been described above in connection with specific embodiments, which are illustrative and should not be considered limiting. In a general manner, the present invention is not limited to the examples illustrated and/or described above. The use of the verbs "comprise", "include", or any other variant, as well as their conjugations, can in no way exclude the presence of elements other than those mentioned. The use of the indefinite article "a", "an", or the definite article "the", to introduce an element does not exclude the presence of a plurality of these elements. The reference numbers in the claims do not limit their scope.

What is claimed is:

1. A method for managing a supply of electrical power to Ethernet devices, each Ethernet device being electrically power-supplied by an Ethernet cable connected to a management system comprising a memory storing a first list of Ethernet devices and identifiers, the first list mapping the Ethernet devices to the identifiers; the method comprising the following steps of:
the management system receives an input information allowing to determine one of the identifiers,
the management system determines, based on the first list, a determined Ethernet device corresponding to the determined identifier, and
the management system interrupts the electrical current or re-establish the electrical current to the Ethernet cable supplying power to the determined Ethernet device;
wherein the reception of the input information allowing for determining at least one of the identifiers is triggered by an operation using an input system, distinct from the Ethernet devices and the management system, and comprising a user device corresponding to one of the identifiers; the input information indicating the user device used in the operation, the memory comprising a third list that maps the identifiers to the user devices,
the method comprising a determination of the first list, the determination of the first list preferably comprising a reception of a list of users, each user corresponding to one of the identifiers, the memory comprising a user list that maps the users to the identifiers,
wherein the operation with the user device is a reading by a user device reader, and
wherein the user device comprises a geolocation device, wherein the geolocation device is an RFID chip or a GPS, and the operation triggering the reception of the input information is a geolocation of the user device in a predetermined area,
wherein the memory comprises a second list that maps the Ethernet devices and the Ethernet cables connected to them,
wherein the first list is determined by scanning Ethernet cables connected to the management system, so as to determine the Ethernet devices connected to the management system.

2. The method of claim 1, wherein the operation is carried out by a user using the user device.

3. The method according to claim 1, wherein the input information allows to determine whether to trigger an interruption of the electrical current or a re-establishment of the electrical current to the Ethernet cable.

4. The method according to claim 1, wherein the user device comprises a clocking device, and the operation triggering the reception is a clocking in, which triggers a re-establishment of the electrical current to the Ethernet cable, or a clocking out, which triggers an interruption of the electrical current to the Ethernet cable.

5. The method according to claim 1, wherein the first list maps at least one of the identifiers to a plurality of Ethernet devices, and wherein the reception of an input information allowing for determining at least one of the identifiers triggers an interruption of the electrical current or a re-establishment of the electrical current to the Ethernet cables supplying power to all the Ethernet devices corresponding to the determined identifier.

6. The method according to claim 1, wherein the first list maps a plurality of identifiers to at least one of the Ethernet devices.

7. The method according to claim 6, wherein the input information also allows to determine whether the determined identifier is in a first state or in a second state, and wherein the re-establishment of the electrical current to the Ethernet cable supplying power to the determined Ethernet device is triggered if at least one of the identifiers is in the first state, and the interruption of the electrical current to the Ethernet cable supplying power to the determined Ethernet device being triggered if all the identifiers are in the second state.

8. The method according to claim 1, wherein at least one of the Ethernet devices is: a telephone, an automated banking machine, an antenna, an interactive terminal, a screen, a printer, a camera, or a docking station.

9. The method according to claim 1, wherein the Ethernet cables are connected on the one hand to the Ethernet devices and on the other hand to ports of a management system, the interruption of the electrical current being carried out by closing the port connected to the Ethernet cable supplying power to the determined Ethernet device, and the re-establishment of the electrical current being carried out by opening the port connected to the Ethernet cable supplying power to the determined Ethernet device.

10. A system for implementing a method for managing a supply of electrical power to Ethernet devices, each Ethernet device being electrically power-supplied by an Ethernet cable connected to a management system comprising a memory storing a first list of Ethernet devices and identifiers, the first list mapping the Ethernet devices to the identifiers;

the method comprising the following steps of:
a determination of the first list, the determination of the first list preferably comprising a reception of a list of users, each user corresponding to one of the identifiers, the memory comprising a user list that maps the users to the identifiers,
the management system receives an input information allowing to determine one of the identifiers,
the management system determines, based on the first list, a determined Ethernet device corresponding to the determined identifier, and
the management system interrupts the electrical current or re-establish the electrical current to the Ethernet cable supplying power to the determined Ethernet device;
wherein the reception of the input information allowing for determining at least one of the identifiers is triggered by an operation using an input system, distinct from the Ethernet devices and the management system, and comprising a user device corresponding to one of the identifiers; the input information indicating the user device used in the operation, the memory comprising a third list that maps the identifiers to the user devices,
wherein the operation with the user device is a reading by a user device reader,
wherein the user device comprises a geolocation device, and the operation triggering the reception of the input information is a geolocation of the user device in a predetermined area, and
wherein the geolocation device is an RFID chip or a GPS,
wherein wherein the first list is determined by scanning Ethernet cables connected to the management system, so as to determine the Ethernet devices connected to the management system,
wherein the memory comprises a second list that maps the Ethernet devices and the Ethernet cables connected to them.

11. The system according to claim 10, wherein the operation is carried out by a user using the user device.

12. The system according to claim 10, wherein the input information allows to determine whether to trigger an interruption of the electrical current or a re-establishment of the electrical current to the Ethernet cable.

13. A non-transitory computer-readable medium on which a computer program comprising instructions that lead a system according to claim 10 to execute the steps of the method according to claim 1 is recorded.

\* \* \* \* \*